(12) United States Patent
Clock et al.

(10) Patent No.: US 8,876,918 B2
(45) Date of Patent: Nov. 4, 2014

(54) BIO-BASED WAX COMPOSITIONS AND APPLICATIONS

(75) Inventors: Andrew J. Clock, Southington, CT (US); Steven McKeown, Southbury, CT (US); Eric Wisnefsky, Southbury, CT (US); Peter Frenkel, Danbury, CT (US)

(73) Assignee: Galata Chemicals, LLC, Southbury, CT (US)

( * ) Notice: Subject to any disclaimer, the term of this patent is extended or adjusted under 35 U.S.C. 154(b) by 303 days.

(21) Appl. No.: 13/392,857

(22) PCT Filed: Sep. 1, 2010

(86) PCT No.: PCT/US2010/047437
§ 371 (c)(1),
(2), (4) Date: May 21, 2012

(87) PCT Pub. No.: WO2011/028744
PCT Pub. Date: Mar. 10, 2011

(65) Prior Publication Data
US 2012/0222347 A1    Sep. 6, 2012

Related U.S. Application Data

(60) Provisional application No. 61/238,940, filed on Sep. 1, 2009.

(51) Int. Cl.
| | | |
|---|---|---|
| *C10L 5/44* | (2006.01) |
| *C11C 5/00* | (2006.01) |
| *C08L 91/06* | (2006.01) |
| *C11C 3/00* | (2006.01) |
| *C08L 91/00* | (2006.01) |

(52) U.S. Cl.
CPC ............ *C11C 3/006* (2013.01); *C11C 5/002* (2013.01); *Y02E 50/30* (2013.01); *C08L 2205/08* (2013.01); *Y02E 50/10* (2013.01); *C08L 91/06* (2013.01); *C08L 91/00* (2013.01)
USPC ............... 44/275; 208/21; 208/24; 431/288

(58) Field of Classification Search
CPC . C11C 5/002; C08L 2555/64; C08L 2555/62; C08L 2555/60
USPC ............ 44/275; 508/304; 431/288; 208/24
See application file for complete search history.

(56) References Cited

U.S. PATENT DOCUMENTS

| | | | |
|---|---|---|---|
| 3,898,039 A * | 8/1975 | Lin ............................. 422/125 |
| 4,038,297 A * | 7/1977 | Rodenberg et al. ........... 554/133 |
| 6,063,144 A | 5/2000 | Calzada et al. |
| 6,214,918 B1 | 4/2001 | Johnson et al. |
| 6,284,007 B1 * | 9/2001 | Tao ................................. 44/275 |
| 6,497,735 B2 * | 12/2002 | Tao ................................. 44/275 |
| 6,503,285 B1 | 1/2003 | Murphy |
| 6,599,334 B1 | 7/2003 | Anderson |
| 6,645,261 B2 | 11/2003 | Murphy et al. |
| 6,730,137 B2 | 5/2004 | Pesu et al. |
| 6,733,548 B2 | 5/2004 | Rasmussen et al. |
| 6,770,104 B2 | 8/2004 | Murphy |
| 6,773,469 B2 | 8/2004 | Murphy |
| 6,797,020 B2 | 9/2004 | Murphy |
| 6,824,572 B2 | 11/2004 | Murphy |
| 7,128,766 B2 | 10/2006 | Murphy et al. |
| 7,192,457 B2 | 3/2007 | Murphy et al. |
| 7,217,301 B2 | 5/2007 | Murphy et al. |
| 7,842,746 B2 * | 11/2010 | Bloom et al. ................. 524/270 |
| 7,951,238 B2 * | 5/2011 | Deneuvillers et al. ........ 106/243 |
| 2003/0046860 A1 | 3/2003 | Tiffany et al. |
| 2003/0061760 A1 | 4/2003 | Tao et al. |
| 2004/0200136 A1 | 10/2004 | Tao et al. |
| 2004/0250464 A1 | 12/2004 | Rasmussen et al. |
| 2005/0060927 A1 | 3/2005 | Murphy |
| 2006/0042157 A1 | 3/2006 | Rycroft |
| 2006/0272200 A1 | 12/2006 | Murphy et al. |
| 2007/0039237 A1 | 2/2007 | Murphy et al. |
| 2007/0151480 A1 | 7/2007 | Bloom et al. |
| 2007/0282000 A1 | 12/2007 | Murphy et al. |
| 2008/0281115 A1 * | 11/2008 | Wang et al. .................... 554/149 |
| 2008/0307696 A1 * | 12/2008 | Wu et al. ......................... 44/275 |
| 2012/0077133 A1 * | 3/2012 | Cagle ............................ 431/291 |
| 2012/0110895 A1 * | 5/2012 | Tao et al. ......................... 44/275 |

* cited by examiner

*Primary Examiner* — Ellen McAvoy
(74) *Attorney, Agent, or Firm* — Dilworth IP LLC

(57) ABSTRACT

Bio-based wax compositions contain at least one of the following components: epoxides of non-hydrogenated vegetable oils, epoxides of fatty acid esters. epoxides of tall oil fatty acid esters, chemically modified epoxides of non-hydrogenated vegetable oils, chemically modified epoxides of fatty acid esters, and chemically modified epoxides of tall oil fatty acid esters. The wax compositions can be used to produce candle sticks, container candles and/or composite materials.

37 Claims, No Drawings

BIO-BASED WAX COMPOSITIONS AND APPLICATIONS

CROSS REFERENCE TO RELATED APPLICATIONS

This application claims the benefit of U.S. provisional application No. 61/238,940, filed Sep. 1, 2009, which is incorporated herein by reference in its entirety.

FIELD OF THE INVENTION

The invention relates to bio-based wax compositions comprising an epoxy product, methods for producing the same, and to candle applications of the bio-based wax compositions.

BACKGROUND OF THE INVENTION

There is a strong consumer demand for bio-based candles as an environmentally friendly alternative to petroleum-based paraffin candles. Soy candles that are produced from derivatized soybean oil were reported to burn longer and to produce less soot, carbon dioxide, and potentially harmful organic volatiles. Scented soy candles better distribute aromas due to their lower melting point, as compared with the paraffin wax products.

The following four major components are known to be used for making bio-based candles from renewable feedstock:

1. Partially and fully hydrogenated vegetable oils (primarily soybean oil);
2. Fatty acids (primarily palmitic and stearic acids);
3. Polyol fatty acid partial esters (such as glycerin mono- and di-stearate); or
4. Products of catalytic trans-esterification of 1 and 3, above.

Many candle compositions optionally contain colorants, fragrances, insect repellants, antioxidants, and/or UV-stabilizers/color stabilizers.

Epoxides of hydrogenated natural oils and their derivatives were reportedly used as intermediates for preparation of candle formulation components.

U.S. Pat. No. 6,063,144 covers candle compositions of vegetable oil, stearic acid, hydrogenated castor oil, and vegetable-derived wax (such as candelilla wax).

U.S. Pat. No. 6,214,918 covers candle compositions of paraffin wax, soybean oil, and a branched hydrocarbon compatibilizer/binding agent.

U.S. Pat. Nos. 6,284,007 and 6,497,735 cover candle compositions of petroleum wax and vegetable lipid components. The vegetable lipid components include vegetable oil or fatty acid/vegetable oil mixtures.

U.S. Pat. No. 6,503,285 and U.S. Publication No. 2005/0060927 cover candle compositions of Partially Hydrogenated Vegetable Oils (PHVO) and Polyol Fatty Acid Partial Esters (PFAPE), such as fatty acid monoesters of glycerol and/or sorbitan.

U.S. Pat. No. 6,599,334 and U.S. Publication No. 2007/0282000 cover candle compositions of PHVO. The composition also contains small amounts of synthetic wax, such as poly-alpha-olefins, and a second hydrogenated vegetable or petroleum oil.

U.S. Pat. No. 6,645,261 covers candle compositions of PHVO of several different solid fat index with different degrees of hydrogenation and palmitic acid.

U.S. Pat. No. 6,730,137 covers candle compositions of paraffin wax and PHVO having a low free fatty acid content.

U.S. Pat. No. 6,770,104 covers candle compositions of PHVO, Fully Hydrogenated Vegetable Oil (FHVO) and PFAPE having a low free acid content.

U.S. Pat. No. 6,773,469 covers candle compositions of PHVO, PFAPE, and fatty acids such as palmitic acid U.S. Pat. No. 6,773,548 covers candle compositions of PHVO, stearic acid, and a creamy vegetable liquid shortening.

U.S. Pat. No. 6,797,020 covers candle compositions of FHVO and several PHVO of varies degrees of hydrogenation in combinations with PFAPE having a low fatty acid content.

U.S. Pat. Nos. 6,824,572 and 7,217,301 cover candle compositions of PHVO and fatty acids, such as palmitic and stearic acids.

U.S. Pat. No. 7,128,766 covers candle compositions of FHVO and PHVO, which includes both soy and palm oil in the same formulation. Paraffin wax, beewax, or carnauba wax is added optionally. Poly-alpha-olefins and glycerin monostearate are used as compatibilizers.

U.S. Pat. No. 7,192,457 covers candle compositions of products of catalytic trans-esterification of vegetable oils, FHVO, and PHVO having a low free acid content.

U.S. Publication No. 2003/0046860 covers candle compositions of FHVO, PHVO, fatty acids, and esters of fatty acids that include PFAPE (monoglycerides an diglycerides), canola methyl esters, propylene glycol monoesters, sorbitan tristearate, and mixtures thereof.

U.S. Publication No. 2003/0061760 covers candle compositions of FHVO, PHVO, stearic acid, a plant-derived surfactant, and microcrystalline petroleum/paraffin wax.

U.S. Publication No. 2004/0200136 covers candle compositions of PHVO, stearic acid, a plant-derived surfactant, petroleum, and natural waxes.

U.S. Publication. No. 2004/0250464 covers liquid candle compositions of PHVO and hardening agent selected from the group consisting of fatty acids, stearin, cetyl alcohol, arachidyl alcohol, and myricyl alcohol and their mixtures.

U.S. Publication No. 2006/0042157 covers candle compositions of PHVO, shea butter, and vegetable oil, such as olive oil.

U.S. Publication No. 2006/0272200 covers candle compositions of PHVO, trans-esterified PHVO, PFAPE, such as mono- and diglycerides, trans-esterified PFAPE, such as mono- and diglycerides. The composition may also contain mineral wax and insect wax.

U.S. Publication No. 2007/0039237 covers candle compositions of PHVO having a blend of soy and palm, PFAPE, and other waxes, such as beewax, carnauba wax, petroleum wax, and Montana wax, used as migration inhibitors.

The following two references contain information on preparation and the use of epoxy-derivatives of hydrogenated vegetable oils as intermediates for obtaining candle formulation components:

U.S. Publication No. 2007/0151480 covers compositions of at least one hydrogenated and partially hydrogenated heat bodied (polymerized; 230° C. and 200-300 psi) hydrogenated oil. The hydrogenated polymer may contain at least one epoxy-group that is formed as a result of oxidative curing. The epoxy-group may be converted into hydroxyl functional group due to hydrolysis. Th process is very energy-intensive.

The '480 publication includes varies types of binders and coatings as well as candle wax (all examples are based on linseed oil) that may optionally contain a vegetable oil, an alkyl ester (propylene glycol mono-stearate, mono- or diglycerides etc.) or petroleum derivative (paraffin, microcrystalline wax, mineral oil), and their combinations.

U.S. Publication No. 2008/0281115 covers compositions of chemically modified PHVO. The modification process includes three-step process that includes a) epoxidation, b) ring-opening through acid-catalyzed hydrolysis to convert the epoxide into the hydroxylate, and c) esterification of the hydroxyl-groups with the use of fatty acid anhydride using butyril anhydride in the methylene chloride solvent. It was specifically mentioned that the epoxy intermediate did not have significantly altered thermal properties compared to PHVO. The multi-step process is very complex.

The entire contents and disclosure of these references are incorporated herein by reference.

Notwithstanding the above literature, the need remains for bio-based wax composition suitable for candle preparations.

SUMMARY OF THE INVENTION

In a first aspect, the invention is directed to a material comprising at least one of epoxy-containing bio-based chemicals or chemically modified epoxy-containing bio-based chemicals. In one embodiment, the material comprises at least one of epoxy-containing bio-based chemicals and chemically modified epoxy-containing bio-based chemicals.

In a second aspect, the invention is directed to a bio-based wax comprising: from 5 wt % to 95 wt % of an epoxy product; and from 5 wt % to 95 wt % of one or more components selected from the group consisting of paraffin waxes, hydrogenated tallow and fats, waxes of fully hydrogenated vegetable oils and partially hydrogenated vegetable oil, fatty acids, polyol fatty acid partial esters, products of trans-esterification of fully and partially hydrogenated vegetable oils, products of trans-esterification of polyol fatty acid partial esters, and mixtures thereof.

In a third aspect, the invention is directed to a candle composition comprising: from 5 wt % to 95 wt % of an epoxy product; and from 5 wt % to 95 wt % of one or more components selected from the group consisting of paraffin waxes, hydrogenated tallow and fats, waxes of fully hydrogenated vegetable oils and partially hydrogenated vegetable oil, fatty acids, polyol fatty acid partial esters, products of trans-esterification of fully and partially hydrogenated vegetable oils, products of trans-esterification of polyol fatty acid partial esters, and mixtures thereof.

DETAILED DESCRIPTION OF THE INVENTION

The present invention generally relates to materials comprising an epoxy-containing bio-based chemical or a chemically modified epoxy-containing bio-based chemicals. In some embodiments the invention relates to a bio-based wax composition comprising at least one epoxy product selected from the group consisting of epoxides of non-hydrogenated oils, epoxides of fatty acid esters, epoxides of tall oil fatty acid esters, and mixtures thereof.

In one embodiment, the epoxy product is chemically modified by trans-esterification of the epoxide-containing components or acid-catalyzed ring-opening reactions of the epoxides with $C_1$-$C_{20}$ alcohols, fatty acids, or $C_1$-$C_{20}$ organic acids. The ring opening reaction may be carried out at temperatures of 80 to 150° C., e.g., at temperatures of 90 to 100° C. Suitable acidic catalysts include mineral acids or lower organic carboxylic acids such as, for example, sulfuric acid, phosphoric acid, formic acid, trifluoromethane sulfonic acid, or acetic acid. The acidic catalysts may be used in concentrations of 0.01 to 1.0 wt %, based on the starting materials. The catalyst acid may then be advantageously neutralized with a base, for example with sodium hydroxide, sodium methylate or tertiary amines.

In one embodiment, the bio-based wax composition further comprises one or more components selected from the group consisting of paraffin waxes, hydrogenated tallow and fats, waxes of fully hydrogenated vegetable oils and partially hydrogenated vegetable oil, fatty acids, polyol fatty acid partial esters, products of trans-esterification of fully and partially hydrogenated vegetable oils, products of trans-esterification of polyol fatty acid partial esters, and mixtures thereof.

In one embodiment, the epoxy product of bio-based wax composition is in an amount of from 5 wt % to 95 wt %, based on the total weight of the bio-based wax composition. The wax of the bio-based wax composition is in an amount of from 5 wt % to 95 wt %, based on the total weight of the bio-based wax composition.

In one embodiment, bio-based wax composition is a waxy material that is a solid at ambient conditions.

The epoxy product may be an epoxide of a non-hydrogenated oil. In one embodiment, the non-hydrogenated oil is a vegetable oil. Suitable vegetable oils include soybean oil, palm oil, peanut oil, olive oil, cotton seed oil, linseed oil, sesame oil, sunflower oil, canola oil, castor oil, rapeseed oil, jatropha oil, algae oil, etc. Soybean oil is preferred. Exemplary epoxy products include epoxidized soybean oil (ESBO), which is commercially available as Drapex™ 6.8 and Drapex™ 39 from Galata Chemicals, LLC (Hahnville, La., USA), and epoxidized linseed oil, which is commercially available as Drapex™ 10.4 from Galata Chemicals, LLC.

The epoxy product may be an epoxide of $C_6$-$C_{40}$, e.g., $C_8$-$C_{22}$, fatty acid esters. Suitable fatty acid esters include, but are not limited to, esters of oleic acid, linoleic acid, linolenic acid, etc. In one embodiment, the fatty acid ester may be derived from a natural origin and may include, for example, esters of fatty acids of beef tallow.

An exemplary epoxide of tall oil fatty acid esters is commercially available as Drapex™ 4.4 (epoxide of 2-ethylhexyl tallate) from Galata Chemicals, LLC.

As discussed above, another component of the bio-based wax compositions may include one or more waxes. Paraffin waxes are commonly used in candles. Hydrogenated tallow includes a waxy type material produced from beef tallow. Fully hydrogenated vegetable oils and partially hydrogenated vegetable oil waxes include those made from soybean oil, palm oil, olive oil, cotton seed oil, linseed oil, sunflower oil, canola oil, castor oil, rapeseed oil, jatropha oil, algae oil, etc. In addition, the wax may be a product of trans-esterification of the fully and partially hydrogenated vegetable oils Fatty acids having from $C_6$-$C_{40}$, e.g., $C_8$-$C_{22}$, may also be used, such as palmitic acid, stearic acid, etc. The wax may also be a polyol fatty acid partial esters such as glycerol mono- and distearate, glycerol mono- and dipalmitate, glycerol mono- and dioleate, sorbitan monolaurate, etc. Additionally, waxes may also include the products of trans-esterification of polyol fatty acid partial esters and mixtures thereof.

Other compounds, such as poly-alpha-olefins and/or microcrystalline wax, can be added in small quantities as compatibilizers to the bio-based wax compositions. In one embodiment, these compounds comprise from 0.01 wt % to 20 wt %, e.g., from 0.5 wt % to 10 wt % or from 1 wt % to 5 wt %, based on the total weight of the bio-based wax composition.

In one embodiment, the bio-based wax compositions are prepared via melt blending. Melt blending may conducted at a temperature of from 30° C. to 500° C. for 0.1 to 10 hours.

According to the other embodiments, the embodiments of the present invention may be used in candles. The candle compositions may optionally contain colorants, fragrances, insect repellants, antioxidants, UV-stabilizers and mixtures thereof. The candle composition may also include a wick. Suitable additives for candle compositions are described in U.S. Pat. Nos. 6,063,144 and 6,503,285, the entire contents and disclosure of which are hereby incorporated by reference. When present, the amount of total additives in the composition is generally in the range from 0.01 wt % to 20 wt %, e.g., from 0.5 wt % to 10 wt % or from 1 wt % to 5 wt %, based on the total weight of the candle.

The colorant is an optional ingredient and is commonly made up of one or more pigments and dyes. Particularly suitable colorants include titanium dioxide, zinc oxide white, copper, bronze, aluminum metal powders and flakes, phthalocyanine blue, phthalocyanine green, yellow and red pigments of the benzimide azolone group, etc.

The fragrance may be a synthetically formed material or a naturally derived oil, such as oil of basil, bergamot, bitter orange, citrus, lemon, mandarin, caraway, cedar leaf, clove leaf, cedar wood, geranium, jasmine, lavender, orange, origanum, rosemary, petitgrain, white cedar, patchouli, lavandin, neroli, vanilla, rose, etc.

Other applications may include composite materials, e.g. artificial firelogs, containing various fillers, such as carbon black, wood, talc, clay, calcium carbonate, titanium dioxide, glass, fiber glass, cellulosic and other synthetic and natural fibers, and mixtures thereof. When present, the proportion of fillers in the composition is generally in the range from 0.01 wt % to 50 wt %, based on the total weight of the composite materials.

EXAMPLES

Thermal properties, impact resistance and burn rate of a number of compositions as disclosed herein and of a number of comparative materials were tested with the outcomes discussed in the following examples.

The test samples were prepared from the following materials: Paraffin wax from Mallinkrodt Baker Inc. (control), soy wax from commercially available soy candle (control), fully hydrogenated soybean oil (FHSBO; IV 1) from Archer Daniels Midland (ADM), partially hydrogenated soybean oil (PHSBO, ADM; IV 47), Palmitic Acid (Hystrene 9016 Flake) from Biogenix Inc, Drapex 6.8 epoxy plasticizer (epoxidized soybean oil) and Drapex 4.4 (epoxidized octyl tallate) manufactured by Galata Chemicals, LLC. Glycerin mono-stearate (GMS) (Kemester 6000 Bead) from Biogenix Inc. and poly-alpha-olefin (PAO)(i.e., hydrogenated 1-decene homopolymer) (Synton PAO 100) from Chemtura Corporation were used as compatibilizers.

To prepare the blends described in the examples, the required amounts of the components were weighed and melt blended in a beaker that was placed on a hotplate that was set at 75° C.

Methods

Thermal properties of the melt blends were studied with the use of Differential Scanning calorimetry (DSC; TA Instruments; Q-100; 10 mg sample size; rate of heating and cooling 10° C./min; three replicates.) The developed information included onset melting temperature, melting peak temperature, solidification peak temperature, heat of melting (via integration of heat of melting), heat of fusion (solidification).

Charpy impact resistance of notched specimens was determined in accordance with ASTM D 6110-02, using pendulum impact machine for tearing (CEAST-6545 equipped with Izod Hammer 4 J/N° 102; sample shape: rectangular cuboid; specimen size 6.6 mm thickness, 7.8 mm width; 85 mm length; specimens were tested without a notch; impact resistance was expressed in net breaking energy/(width×thickness)). Specimens were prepared by removing melt blends from the hot plate and pouring the melt blends into dogbone molds and allowing the blends to cool. Upon cooling, material shrinkage caused the sample to break towards one end, in the wide section of the dogbone. The sample was then removed from the mold and cut to a rectangular shape for impact testing. Three specimens of each formulation were used for impact testing.

The rectangular specimen was placed into the impact tester specimen holder, a horizontal fixture that secures the two ends of the specimen firmly between two flat bars, leaving a center section of 20 mm exposed to the impactor. The impactor is then raised to a calibrated height, which leads to a certain amount of energy release upon impact with the specimen. In the particular instrument used, the impactor swings on an arc and contacts the specimen when moving horizontally and perpendicular to the length of the specimen. A small round impact head was used for all tests. The average of three measurements was calculated.

Burn Rate

A melt blend was poured into a 50 ml glass beaker containing a wick which was then lit with a match and allowed to burn on a bench for two hours. The weight after the burn cycle was subtracted from the original weight and divided by two, the number of hours. The calculated number represents an hourly burn rate.

EXAMPLES

Samples of Parafin, soy wax, FHSBO/ESBO blends, PHSBO/ESBO blends, Palmitic Acid/ESBO blends, Paraffin/Drapex 4.4 blends and Paraffin/ESBO blends were provided as described above, the blend proportions being indicated in the following Tables. All "%" values are weight percent values unless the context requires otherwise. The DSC thermal characteristics the samples were tested as described above, and the DSC results are set forth in Tables 1-5B. The noted "Observations" indicate the physical state of the sample at room temperature after the DSC test.

The DSC Characteristics of various FHSBO/ESBO blends are set forth in Table 1.

TABLE 1

DSC Characteristics of FHSBO/ESBO blends

| FHSBO, % | ESBO, % | Onset Melting Point, ° C. | Melting Point, ° C. | Solidification Point, ° C. | Observations |
|---|---|---|---|---|---|
| Paraffin (control) | | 32.98/48.20 | 34.84/54.82 | 50.05/32.45 | White solid |
| Soy wax (control) | | 42.08 | 44.63 | 31.01 | Off-white solid |
| 100 | 0 | 50.42/59.32 | 53.64/62.41 | 47.00 | White solid |
| 95 | 5 | 49.27/58.20 | 52.58/61.53 | 47.96 | White solid |

TABLE 1-continued

DSC Characteristics of FHSBO/ESBO blends

| FHSBO, % | ESBO, % | Onset Melting Point, °C. | Melting Point, °C. | Solidification Point, °C. | Observations |
|---|---|---|---|---|---|
| 90 | 10 | 48.05/57.55 | 51.14/61.83 | 46.77 | White solid |
| 80 | 20 | 47.08/56.73 | 51.03/61.46 | 47.00 | White solid |
| 60 | 40 | 56.29/64.02 | 60.87/64.78 | 45.94 | White solid |
| 40 | 60 | 53.51/63.93 | 57.19/64.66 | 44.40 | White solid |
| 20 | 80 | 54.48 | 62.63 | 42.09 | Soft solid |
| 10 | 90 | 53.78 | 61.93 | 35.27 | Semi-liquid |

The data of Table 1 show that FHSBO/ESBO blends were compatible and had higher onset temperature and peak melting points than both soy wax and paraffin controls. The blends containing more than 60% ESBO are soft solids and/or semi-liquids.

The DSC Characteristics of various PHSBO/ESBO blends are set forth in Table 2.

TABLE 2

DSC Characteristics of PHSBO/ESBO blends

| PHSBO, % | ESBO, % | Onset Melting Point, °C. | Melting Point, °C. | Solidification Point, °C. | Observations |
|---|---|---|---|---|---|
| Paraffin (control) | | 32.98/48.20 | 34.84/54.82 | 50.05/32.45 | White solid |
| Soy wax (control) | | 42.08 | 44.63 | 31.01 | Off-white solid |
| 100 | 0 | 39.57 | 51.98 | 34.80 | White solid |
| 80 | 20 | 37.59 | 49.73 | 32.19 | White solid |
| 60 | 40 | 37.84 | 48.78 | 31.84 | Soft solid |
| 40 | 60 | 44.92 | 48.07/52.81 | 30.03 | Semi-liquid |

The data of Table 2 show that PHSBO/ESBO blends were compatible and of higher melting peak temperatures than the controls. The blends containing more than 40% ESBO were soft solids and/or semi-liquid.

The DSC Characteristics of Palmitic Acid/ESBO blends are set forth in Table 3.

TABLE 3

DSC Characteristics of Palmitic Acid/ESBO blends

| Palmitic Acid, % | ESBO, % | Onset Melting Point, °C. | Melting Point, °C. | Solidification Point, °C. | Observations |
|---|---|---|---|---|---|
| Paraffin (control) | | 32.98/48.20 | 34.84/54.82 | 50.05/32.46 | White solid |
| 100 | 0 | 59.33 | 64.07 | 55.42 | White solid |
| 95 | 5 | 49.27/58.36 | 63.76 | 55.12 | Heterogeneous solid |
| 90 | 10 | 57.64 | 62.57 | 55.27 | Heterogeneous solid |
| 80 | 20 | 56.65 | 60.75 | 55.30 | Heterogeneous solid |
| 60 | 40 | 52.68 | 59.33 | 53.28 | Heterogeneous solid |
| 40 | 60 | 47.97 | 56.37 | 50.44 | Heterogeneous solid |
| 10 | 90 | 20.82 | 38.87 | | Waxy Liquid |

As indicated in Table 3, palmitic acid/ESBO blends were observed to be heterogeneous. The data of Table 3 show that the blends containing up to 60% ESBO were of higher melting peak temperatures than that of the controls. The 10/90 Palmitic acid/ESBO blend was liquid.

The DSC Characteristics of various Paraffin/Drapex 4.4 blends are set forth in Table 4.

TABLE 4

DSC Characteristics of Paraffin/Drapex 4.4 blends

| Parafin, % | Drapex 4.4, % | Onset Melting Point, °C. | Melting Point, °C. | Solidification Point, °C. | Observations |
|---|---|---|---|---|---|
| 100 (control) | 0 | 32.98/48.20 | 34.84/54.82 | 50.05/32.45 | White solid |
| 90 | 10 | 28.97/45.70 | 35.88/54.07 | 47.81/31.11 | White solid |
| 80 | 20 | 29.38/44.26 | 36.03/53.18 | 47.36/32.01 | White solid |

As indicated in Table 4, paraffin/Drapex 4.4 blends were homogeneous (compatible) without using any compatibilizer. The data of Table 4 show that the addition of 10-20% Drapex 4.4 reduced the first onset melting point temperature by about 4° C. but did not have an adverse effect on melting peak temperatures.

The DSC Characteristics of Paraffin/ESBO blends are set forth in Table 5A.

TABLE 5A

DSC Characteristics of Paraffin/ESBO blends

| Paraffin, % | ESBO, % | GMS, % | Onset Melting Point, °C. | Melting Point, °C. | Solidification Point, °C. | Observations |
|---|---|---|---|---|---|---|
| 100 (control) | 0 | 0 | 32.98/48.20 | 34.84/54.82 | 50.05/32.45 | White solid |
| 95 | 5 | 0 | | | | Phase separation |
| 90 | 10 | 0 | | | | Phase separation |
| 90 | 5 | 5 | 28.67/47.29 | 34.80/54.82 | 49.37/31.96 | White solid |
| 85 | 10 | 5 | 28.69/47.83 | 35.59/55.12 | 48.85/31.56 | White solid |
| 80 | 15 | 5 | 28.83/47.74 | 35.44/55.27 | 48.85/31.86 | White solid |
| 75 | 20 | 5 | 28.76/47.79 | 35.14/54.67 | 49.15/31.71 | White solid |
| 70 | 25 | 5 | 28.63/46.98 | 35.36/54.06 | 49.82/32.10 | White solid |
| 65 | 30 | 5 | 28.55/47.14 | 35.35/54.05 | 49.74/31.88 | White solid |
| 60 | 35 | 5 | 28.66/47.21 | 35.48/54.15 | 49.66/31.95 | White solid |
| 55 | 40 | 5 | | | | Semi-liquid |

As indicated in Table 5A, paraffin was incompatible with ESBO in the absence of a compatibilizer. However, the data of Table 5 show that addition of 5% GMS surprisingly enabled preparation of the solid homogeneous blends that contained up to 35% ESBO.

Addition of 5-35% ESBO reduced the first onset temperature of melting by about 4° C. but did not affect the second onset melting point, melting and solidification peak temperatures. Addition of more than 35% ESBO resulted in soft solid/semi-liquid materials.

A sample employing PAO as an alternative compatibilizer was prepared and tested as described in relation to Table 5A. The results and data for a GMS sample are set forth in Table 5B.

TABLE 5B

DSC Characteristics of Paraffin/ESBO blends with GMS and PAO

| Paraffin, % | ESBO, % | Compatibilizer (content, %) | Onset Melting Point, °C. | Melting Point, °C. | Solidification Point, °C. | Observations |
|---|---|---|---|---|---|---|
| 100 (control) | 0 | None (0) | 32.98/48.20 | 34.84/54.82 | 50.05/32.45 | White solid |
| 90 | 5 | GMS (5) | 28.67/47.29 | 34.80/54.82 | 49.37/31.96 | White solid |
| 90 | 5 | PAO (5) | 28.79/47.56 | 35.04/54.82 | 49.49/31.60 | White solid |

The data of Table 5B show that the effect of PAO is very similar to that of GMS.

Blends that were compatible and demonstrated comparable with the thermal properties of the control materials were selected for impact resistance and burn rate testing; their heats of melting were calculated and compared to that of the paraffin control. The results are set forth in Table 6.

TABLE 6

Melting heat, impact resistance and burn rate of the selected blends

| Components | %/% | Heat of melting, J/g | Heat reduction**, % | Impact resistance, J/mm² | Burn rate, g/hr | Burn rate reduction**, % |
|---|---|---|---|---|---|---|
| Paraffin (control) | 100 | 179.7 | — | 1.62 | 2.40/2.99 | — |
| Soy wax (control) | 100 | 78.3 | | 0.61 | 1.65 | |
| Paraffin/ESBO* | 85/10 | 156.2 | 13 | 1.64 | 1.39/1.39 | 49 |
| Paraffin/ESBO* | 75/20 | 142.9 | 20 | 1.72 | 2.52/2.10 | 15 |
| Paraffin/ESBO* | 65/30 | 138.8 | 23 | 1.64 | 2.47 | 9 |
| FHSBO/ESBO | 40/60 | 52.13 | 71 | 2.38 | 1.43 | 47 |
| PHSBO/ESBO | 80/20 | 106.4 | | 0.62 | 1.70 | |
| PHSBO/ESBO | 60/40 | 58.9 | | 0.55 | | |

*All Paraffin/ESBO blends contained 5% GMS
**Compared with the Paraffin control

The data of Table 6 demonstrate that the addition of 10-30% ESBO to paraffin unexpectedly results in a reduction in heat of melting and a reduction in burn rate. Also, the same blends of paraffin/ESBO type candle wax showed at least as good impact resistance as that of the paraffin control.

The data also show that the 40/60 FHSBO/ESBO blend outperformed the Paraffin wax control on all tested thermal and mechanical parameters; it had 71 and 47% melting heat and burn rate reduction, respectively, compared with that of the paraffin control. Also, the 80/20 PHSBO/ESBO blend showed excellent compatibility and phase stability during the burn and well matched impact and burn rate characteristics of the soy wax control.

In view of the many changes and modifications that can be made without departing from principles underlying the invention, reference should be made to the appended claims for an understanding of the scope of the protection to be afforded the invention.

What is claimed is:

1. A wax composition comprising:
from 5 wt % to 95 wt % of at least one non-hydrogenated epoxy product selected from the group consisting of epoxides of vegetable oils, epoxides of fatty acid esters, epoxides of tall oil fatty acid esters, chemically modified derivatives of non-hydrogenated epoxy products, and mixtures thereof; and
from 5 wt % to 95 wt % of at least one wax component selected from the group consisting of paraffin waxes, hydrogenated tallow and fats, waxes of fully hydrogenated vegetable oils and partially hydrogenated vegetable oils, fatty acids, polyol fatty acid partial esters, products of trans-esterification of fully and partially hydrogenated vegetable oils, products of trans-esterification of polyol fatty acid partial esters, and mixtures thereof.

2. The wax composition of claim 1, wherein the non-hydrogenated epoxy product comprises epoxidized soybean oil.

3. The wax composition of claim 1, wherein the non-hydrogenated epoxy product comprises epoxidized linseed oil.

4. The wax composition of claim 1, wherein the non-hydrogenated epoxy product comprises an epoxide of 2-ethylhexyl tallate.

5. The wax composition of claim 1, wherein the non-hydrogenated epoxy product is transesterified.

6. The wax composition of claim 1, wherein the chemically modified derivatives of non-hydrogenated epoxy products comprise the products obtained by acid-catalyzed ring-opening reactions of non-hydrogenated epoxy products with $C_1$-$C_{20}$ alcohols, fatty acids, or $C_1$-$C_{20}$ organic acids.

7. The wax composition of claim 1 comprising a composition that is a solid at ambient conditions.

8. The wax composition of claim 1, wherein the wax component comprises a paraffin wax.

9. The wax composition of claim 8 further comprising a compatibilizer.

10. The wax composition of claim 9, wherein the compatibilizer is glycerin-mono stearate.

11. The wax composition of claim 9, wherein the compatibilizer is a poly-alpha-olefin.

12. The wax composition of claim 1 comprising from 5 wt. percent to 60 wt. percent, based on the total weight of the wax composition, of a non-hydrogenated epoxy product and wherein the wax component is selected from the group consisting of paraffin waxes, waxes of fully hydrogenated vegetable oils and partially hydrogenated vegetable oils, and mixtures thereof.

13. The wax composition of claim 12, wherein the wax component comprises a paraffin wax.

14. The wax composition of claim 12, wherein the non-hydrogenated epoxy product comprises epoxidized vegetable oil and the wax component comprises fully hydrogenated vegetable oil or partially hydrogenated vegetable oil.

15. The wax composition of claim 12, wherein the non-hydrogenated epoxy product comprises epoxidized soybean oil and the wax component comprises fully hydrogenated soybean oil or partially hydrogenated soybean oil.

16. The wax composition of claim 12, wherein the non-hydrogenated epoxy product comprises epoxidized soybean oil and the wax component comprises partially hydrogenated soybean oil.

17. The wax composition of claim 1 comprising from 5 wt. percent to 40 wt. percent, based on the total weight of the wax composition, of a non-hydrogenated epoxy product, and wherein the non-hydrogenated epoxy product comprises epoxidized soybean oil and the wax component comprises partially hydrogenated soybean oil.

18. The wax composition of claim 1, wherein the epoxy product is from 5 wt. percent to 35 wt. percent of the total weight of the wax composition.

19. The wax composition of claim 1, wherein the epoxy product is selected from the group consisting of epoxidized vegetable oils, epoxides of tall oil fatty acid esters, and mixtures thereof, and the wax component is selected from the group consisting of paraffin waxes, waxes of fully hydrogenated vegetable oils and partially hydrogenated vegetable oils, and mixtures thereof.

20. The wax composition of claim 19, wherein the wax component comprises paraffin wax.

21. The wax composition of claim 1, further comprising a compatibilizer.

22. The wax composition of claim 19, wherein the epoxidized vegetable oils comprise epoxidized soybean oil, the waxes of fully hydrogenated vegetable oils comprise fully hydrogenated soybean oil and the partially hydrogenated vegetable oils comprise partially hydrogenated soybean oil.

23. A candle composition comprising the wax composition of claim 1.

24. The candle composition of claim 23, further comprising one or more additives selected from the group consisting of colorants, fragrances, insect repellants, antioxidants, UV-stabilizers, and mixtures thereof.

25. A candle composition comprising the wax composition of claim 19.

26. The candle composition of claim 25 further comprising one or more additives selected from the group consisting of colorants, fragrances, insect repellants, antioxidants, UV-stabilizers, and mixtures thereof.

27. A candle composition comprising the wax composition of claim 22.

28. The candle composition of claim 27 further comprising one or more additives selected from the group consisting of colorants, fragrances, insect repellants, antioxidants, UV-stabilizers, and mixtures thereof.

29. A method for making a wax composition comprising blending
    from 5 wt % to 95 wt % of at least one epoxy product selected from the group consisting of epoxides of non-hydrogenated oils, epoxides of fatty acid esters, epoxides of tall oil fatty acid esters, and mixtures thereof; and
    from 5 wt % to 95 wt % of at least one wax component selected from the group consisting of paraffin waxes, hydrogenated tallow and fats, waxes of fully hydrogenated vegetable oils and partially hydrogenated vegetable oils, fatty acids, polyol fatty acid partial esters, products of trans-esterification of fully and partially hydrogenated vegetable oils, products of trans-esterification of polyol fatty acid partial esters, and mixtures thereof.

30. The method of claim 25, wherein the blending is melt-blending.

31. The method of claim 26, wherein the melt-blending is conducted at a temperature of from 30° C. to 500° C.

32. The method of claim 26, wherein the melt-blending is conducted for from 0.1 to 10 hours.

33. A wax composition comprising:
    at least one non-hydrogenated epoxy product selected from the group consisting of epoxides of vegetable oils and mixtures thereof; and
    at least one wax component selected from the group consisting of paraffin waxes, hydrogenated tallow and fats, waxes of fully hydrogenated vegetable oils and partially hydrogenated vegetable oils, fatty acids, polyol fatty acid partial esters, products of trans-esterification of fully and partially hydrogenated vegetable oils, products of trans-esterification of polyol fatty acid partial esters, and mixtures thereof.

34. A wax composition comprising:
    at least one non-hydrogenated epoxy product selected from the group consisting of epoxides of vegetable oils, epoxides of fatty acid esters, epoxides of tall oil fatty acid esters, chemically modified derivatives of non-hydrogenated epoxy products, and mixtures thereof; and
    at least one wax component selected from the group consisting of hydrogenated tallow and fats, waxes of fully hydrogenated vegetable oils and partially hydrogenated vegetable oils, and mixtures thereof.

35. A wax composition comprising:
    at least one non-hydrogenated epoxy product selected from the group consisting of epoxides of vegetable oils and mixtures thereof; and
    at least one wax component selected from the group consisting of hydrogenated tallow and fats, waxes of fully hydrogenated vegetable oils and partially hydrogenated vegetable oils, and mixtures thereof.

36. The wax composition of claim 35 wherein the at least one wax component is selected from the group consisting of waxes of fully hydrogenated vegetable oils, waxes of partially hydrogenated vegetable oils and mixtures thereof.

37. A wax composition comprising:
    at least one non-hydrogenated epoxy product selected from the group consisting of epoxides of vegetable oils, epoxides of fatty acid esters, epoxides of tall oil fatty acid esters, chemically modified derivatives of non-hydrogenated epoxy products, and mixtures thereof; and
    at least one wax component selected from the group consisting of paraffin waxes, hydrogenated tallow and fats, waxes of fully hydrogenated vegetable oils and partially hydrogenated vegetable oils, fatty acids, polyol fatty acid partial esters, products of trans-esterification of fully and partially hydrogenated vegetable oils, products of trans-esterification of polyol fatty acid partial esters, and mixtures thereof.

* * * * *